(12) United States Patent
Vangemert

(10) Patent No.: US 6,289,386 B1
(45) Date of Patent: Sep. 11, 2001

(54) IMPLEMENTATION OF A DIVIDE ALGORITHM FOR BUFFER CREDIT CALCULATION IN A HIGH SPEED SERIAL CHANNEL

(75) Inventor: Rene Vangemert, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/075,710

(22) Filed: May 11, 1998

(51) Int. Cl.$^7$ .................................................. G06F 15/16
(52) U.S. Cl. ......................... 709/232; 709/236; 709/250
(58) Field of Search ................................... 709/232, 200, 709/201, 250, 221, 223, 224, 225, 236; 370/292, 463

(56) References Cited

U.S. PATENT DOCUMENTS

| | | | |
|---|---|---|---|
| 5,610,745 | * 3/1997 | Bennett | 359/139 |
| 5,748,613 | * 5/1998 | Kilk et al. | 370/231 |
| 5,825,748 | * 10/1998 | Barkey et al. | 370/236 |
| 6,005,849 | * 12/1999 | Roach et al. | 370/276 |
| 6,006,283 | * 12/1999 | Hsieh et al. | 710/9 |
| 6,081,847 | * 6/2000 | Lin | 709/250 |
| 6,092,167 | * 7/2000 | Cheung et al. | 711/169 |
| 6,097,698 | * 8/2000 | Yang et al. | 370/231 |
| 6,160,813 | * 12/2000 | Banks et al. | 370/422 |
| 6,163,540 | * 12/2000 | Cheung et al. | 370/394 |

* cited by examiner

Primary Examiner—Moustafa M. Meky
Assistant Examiner—Tod Kupstas
(74) Attorney, Agent, or Firm—Conley, Rose & Tayon, PC; B. Noel Kivlin

(57) ABSTRACT

A network interface unit which implements a low latency algorithm for buffer credit calculation. In one embodiment, a system network is provided with a remote node coupled to a local node by a serial communications link. The remote node is configured to transmit a data frame to the local node only if the remote node receives a buffer credit which indicates that the local node has available receive buffer space for a data frame. The local node includes a network interface unit for coupling to the serial communications link, and the network interface unit includes a receive buffer, a receive controller, a transmit controller, and a buffer credit manager. The receive controller stores incoming data frames in the receive buffer until they can be forwarded to the i/o bus of the local node. The transmit controller is configured to send buffer credits to the remote node in response to a credit signal from the buffer credit manager. The buffer credit manager is coupled to the receive controller to receive a receive flag for each data frame which is completely received by the receive buffer, and coupled to the transmit controller to receive a transmit flag for each buffer credit sent. The buffer credit manager iteratively determines the committed buffer space from the amount of data stored in the receive buffer and the receive and transmit flags, and generates the credit signal using a comparator which compares committed-but-unoccupied buffer space to the available space in the receive buffer, and asserts the credit signal if the available buffer space is greater than the committed buffer space by at least the maximum frame size.

14 Claims, 4 Drawing Sheets

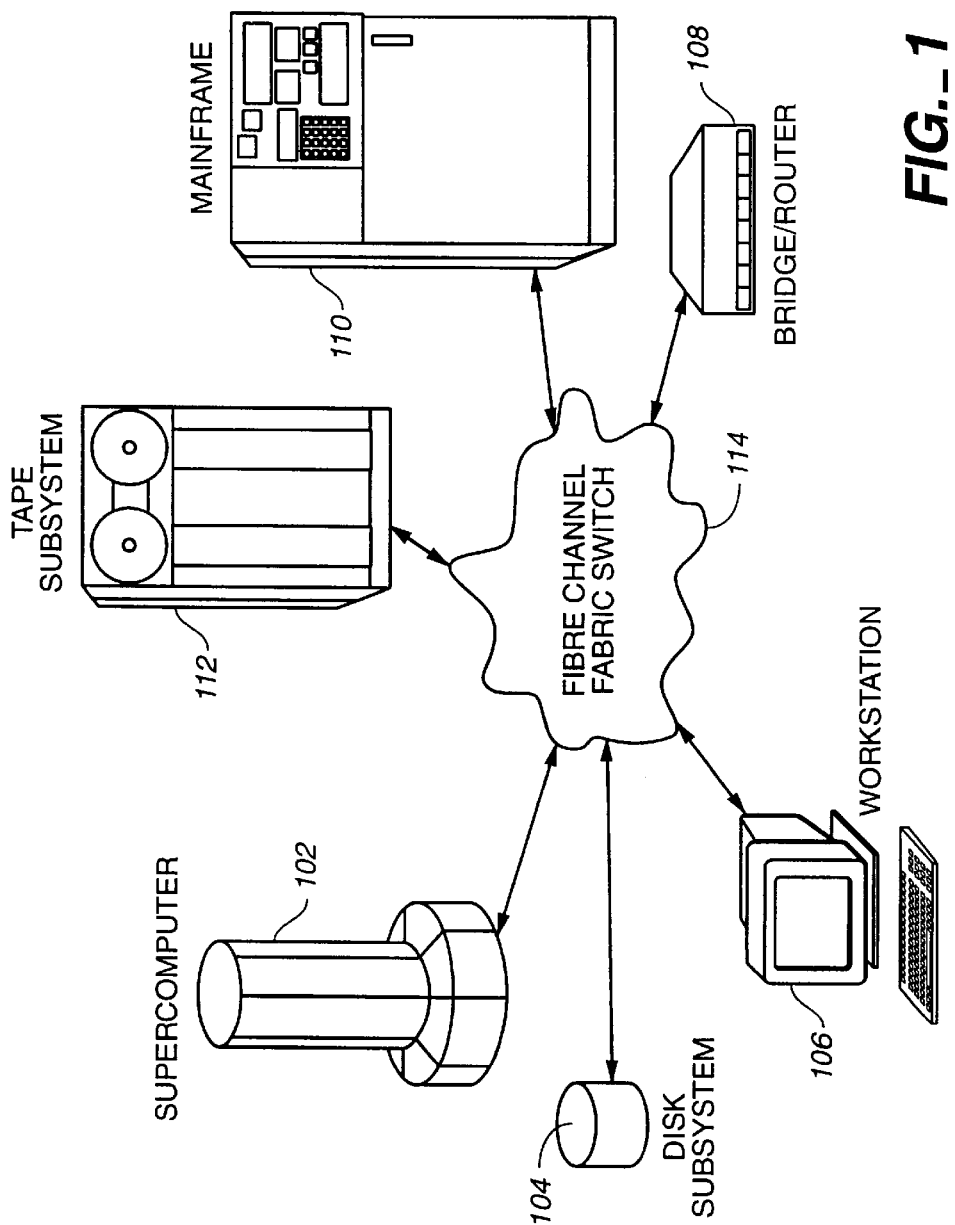
FIG._1

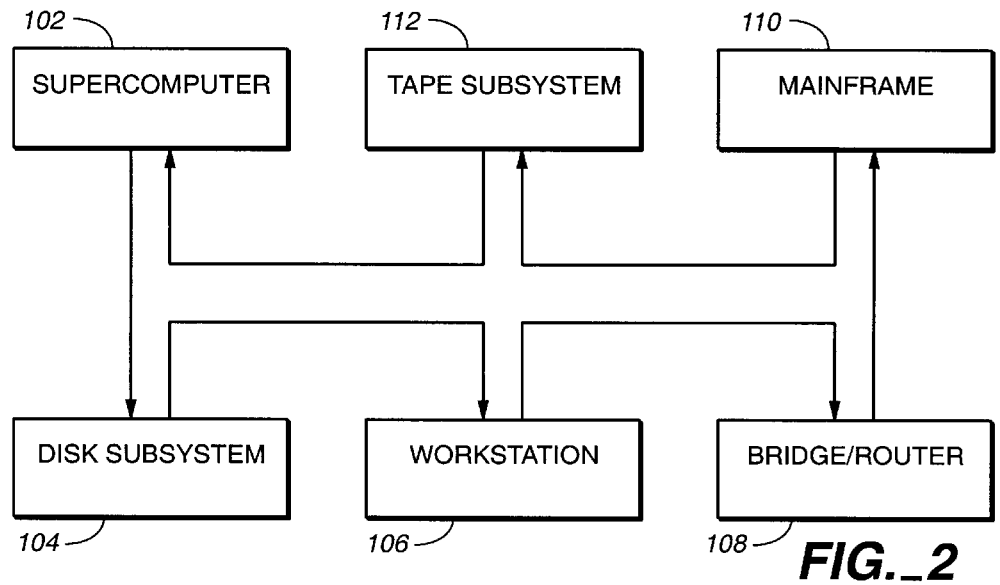
FIG._2
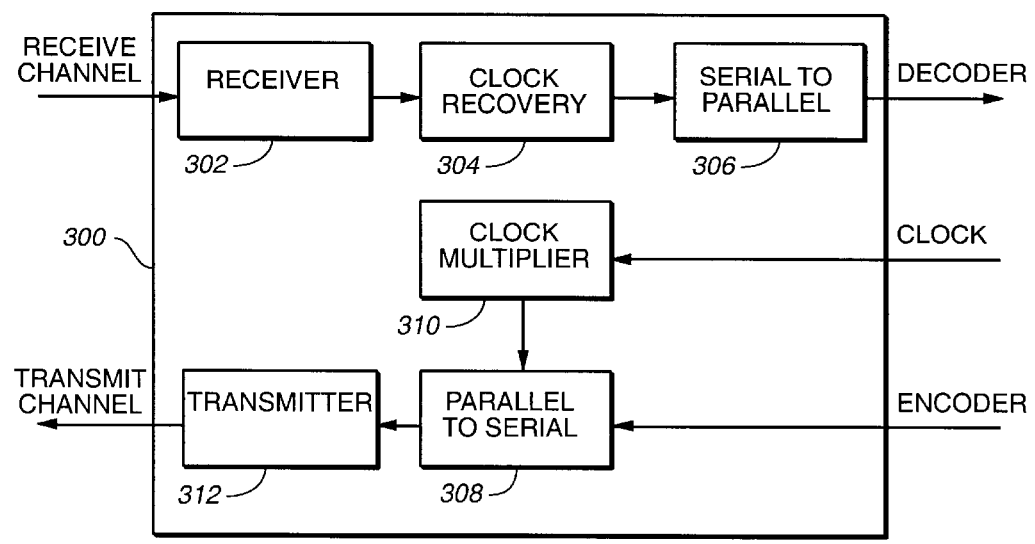
FIG._3

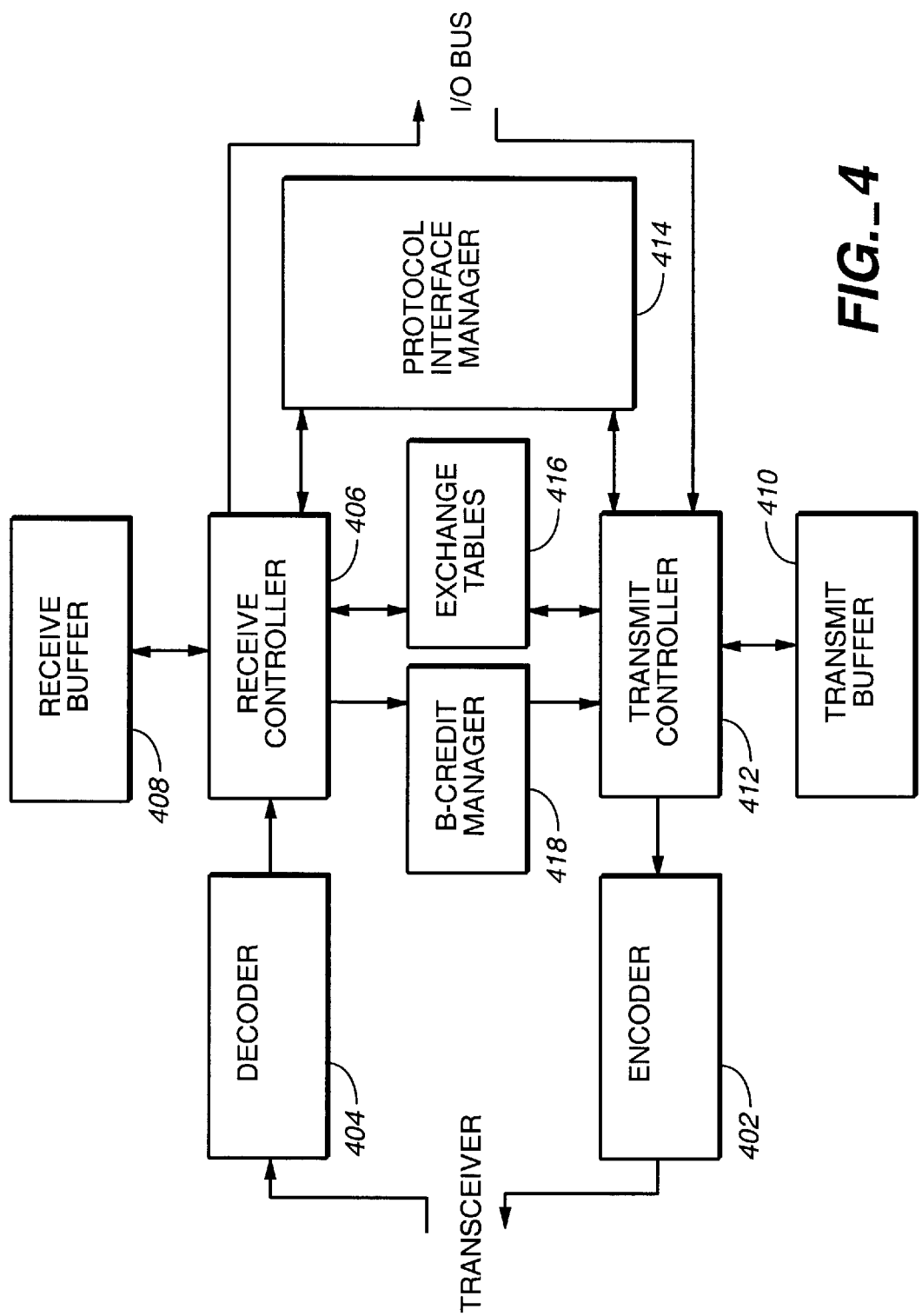
FIG._4

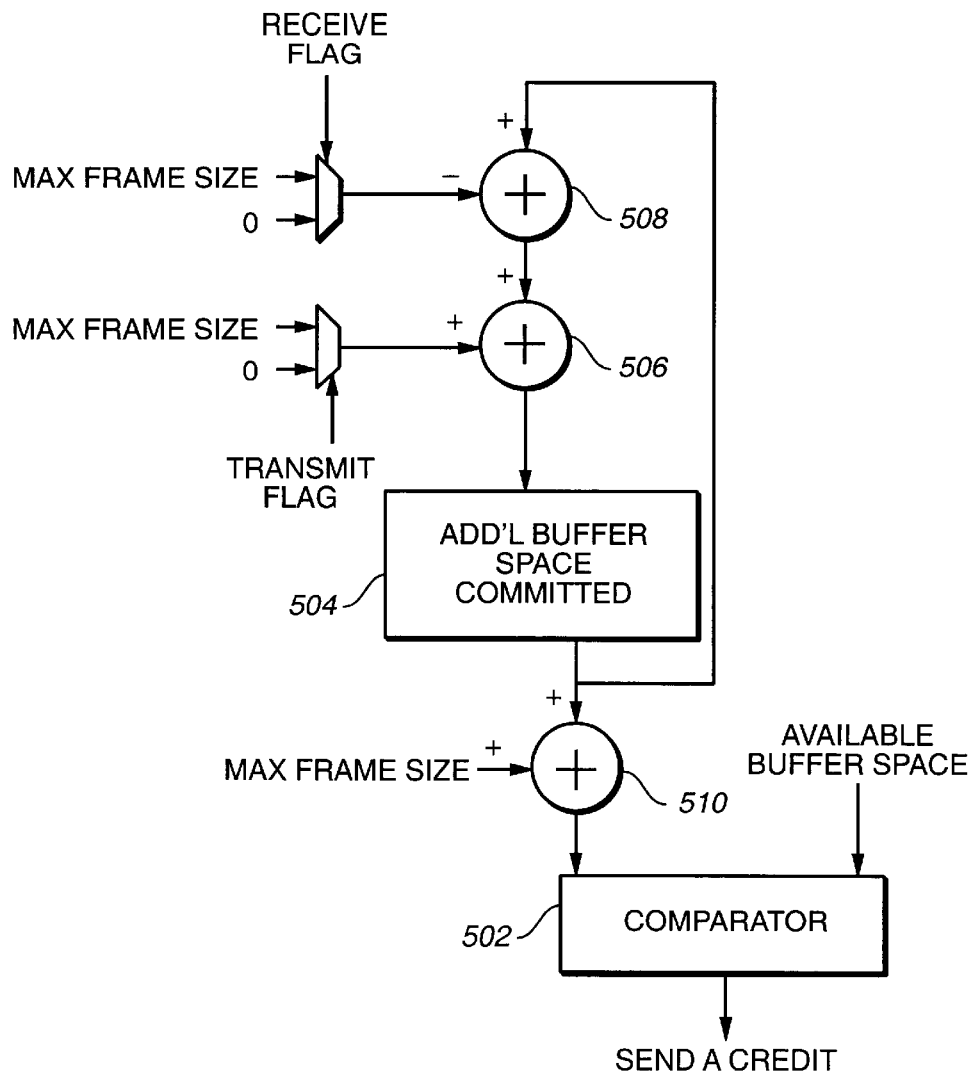
FIG._5

IMPLEMENTATION OF A DIVIDE ALGORITHM FOR BUFFER CREDIT CALCULATION IN A HIGH SPEED SERIAL CHANNEL

BACKGROUND OF THE INVENTION

1. Field of the Invention

This invention relates to the field of computer networking, and in particular to a fast implementation of a buffer-credit based system for high speed serial communication.

2. Description of the Related Art

Internetworking of high-performance computers has become the focus of much attention in the data communications industry. Performance improvements in processors and peripherals, along with the move to distributed architectures such as client/server, have spawned increasingly data-intensive and high-speed networking applications, such as medical imaging, multimedia, and scientific visualization. However, the interconnections between the systems and their input/output devices cannot keep up with the blinding data rates, nor can they provide the distances needed for local area networks spanning campus-wide areas.

According to "Amdahl's Law", a megabit per second of input/output (I/O) capability is needed for every MIPS of processor performance. Current communications standards top out at just over 100 megabits per second, not nearly fast enough, as technical computing applications already demand processors exceeding 1,000 MIPS. The deficiencies in current transmission rates results in the communications channel becoming a bottleneck to system performance.

A new protocol known as Fibre Channel is 10 to 250 times faster than existing networks, transmitting at rates exceeding 1 Gbps in both directions simultaneously. It defines standard media and signaling conventions for transporting data in a serial fashion, it provides an error correcting channel code and a frame structure for transporting the data, it sets out a flow control methodology, creates some common services, and supports interfaces to existing higher level protocols such as SCSI (small computer system interface). The Fibre Channel protocol can be applied to various network topologies including point-to-point, ring, and switched. The Fibre Channel protocol is being proposed as an ANSI (American National Standards Institute, Inc.) standard, and a multitude of reference material is readily available at http://www.fibrechannel.com.

Of interest to the instant application, the Fibre Channel protocol sets out a buffer-credit flow control methodology. Under this methodology, before a first network node (initiating node) can transmit a data frame to a second network node (responding node), the initiating node must first receive a buffer-credit from the responding node, indicating that the responding node has available space in its receive buffer for a data frame. Due to the high data rates, minimum latencies are required. It is undesirable for the responding node to determine an available number of buffer credits by dividing the receive buffer capacity by the maximum frame size. Further, predetermination of the number of buffer credits is not possible due to the programmability of the maximum frame size, and assuming a worst case scenario (as is necessary for predetermination) results in extremely inefficient use of the receive buffer. A low-latency implementation of buffer-credit determination is needed.

SUMMARY OF THE INVENTION

Accordingly, there is provided herein a network interface unit which implements a low latency algorithm for buffer credit calculation. In one embodiment, a system network is provided with a remote node coupled to a local node by a serial communications link. The remote node is configured to transmit a data frame to the local node only if the remote node receives a buffer credit which indicates that the local node has available receive buffer space for a data frame. The local node includes a network interface unit for coupling to the serial communications link, and the network interface unit includes a receive buffer, a receive controller, a transmit controller, and a buffer credit manager. The receive controller stores incoming data frames in the receive buffer until they can be forwarded to the i/o bus of the local node. The transmit controller is configured to send buffer credits to the remote node in response to a credit signal from the buffer credit manager. The buffer credit manager is coupled to the receive controller to receive a receive flag for each data frame which is completely received by the receive buffer, and is also coupled to the transmit controller to receive a transmit flag for each buffer credit sent. The buffer credit manager iteratively determines the additional committed buffer space (i.e. the space committed but not yet occupied by receive data) by counting the number of receive and transmit flags, and generates the credit signal using a comparator which compares the sum of additional committed buffer space and the maximum frame size to the available receive buffer storage capacity and asserts the credit signal if the available buffer space is greater than or equal to the sum of the maximum frame size and the additional committed buffer space.

BRIEF DESCRIPTION OF THE DRAWINGS

Other objects and advantages of the invention will become apparent upon reading the following detailed description and upon reference to the accompanying drawings in which:

FIG. 1 shows a system network with exemplary nodes coupled via serial links;

FIG. 2 shows a system network configured as an arbitrated loop;

FIG. 3 shows a serial communication transceiver;

FIG. 4 shows a network interface unit; and

FIG. 5 shows a buffer credit manager.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 illustrates an exemplary system network having as nodes a supercomputer 102, a disk subsystem 104, a workstation 106, a bridge/router 108, a mainframe 110, and a tape subsystem 112. Each of the nodes is coupled to a central "fabric switch" 114 by a serial link having a receive channel and a transmit channel. The fabric switch 114 is shown nebulously since the exact network topology is unimportant to the present disclosure. It is sufficient to stipulate that the fabric switch 114 transports data frames and control words from the transmit channel of a source node to the receive channel of a destination node. The number and routing of concurrent connections is determined by the fabric switch.

One specific fabric switch embodiment is illustrated in FIG. 2. The nodes are coupled in an "arbitrated loop" topology, in which the transmit channel from one node is directly connected to the receive channel of the next node. In this topology, only one initiator-responder connection is supported at a time, with the rest of the nodes simply "passing along" anything they receive. Using control words, an initiating node first arbitrates to get control of the loop, then notifies a responding node of its desire to transmit data frames. The initiating and responding node negotiate a mutually agreeable frame size, then the responding node provides a buffer credit to the initiating node for each data frame it has space to accommodate. Upon receipt of the buffer credits, the initiating node begins transmitting data frames, one per credit, until the data has been sent.

FIG. 3 illustrates a serial communication transceiver 300 which may be used by the nodes to couple to the serial communications link. Transceiver 300 includes a receiver 302 coupled to the receive channel to sense incoming signal levels, clean them up as much as possible, and provide them to a clock recovery module 304. Clock recovery module 304 uses the incoming signal to reconstruct a clock signal synchronized to the incoming data, and a serial-to-parallel converter 306 uses the clock signal to convert the incoming signal from serial form to parallel form. In one embodiment, converter 306 outputs one 10-bit channel codeword at a time. The output from the converter 306 is sent to a decoder.

Transceiver 300 also includes a parallel-to-serial converter 308 which receives a stream of codewords from an encoder and uses a clock signal from clock multiplier 310 to convert the stream of codewords into a serial bitstream. Transmitter 312 then converts the serial bitstream into signals suitable for transport by the transmit channel. Transceiver 300 is typically provided on a network card which resides on the i/o bus of a node. The interface between the transceiver 300 and the i/o bus is provided by a network interface unit such as that shown in FIG. 4.

One embodiment of a network interface unit is provided in FIG. 4. It includes an encoder 402 and a decoder 404 coupled to the transceiver 300. Encoder 402 and decoder 404 provide error correction coding and decoding for information transmitted across the serial link. Decoded data from decoder 404 is provided to receive controller 406. Receive controller stores received control words and data frames in receive buffer 408. If the node is in a "pass along" mode, the receive buffer 408 is also used as a transmit buffer 410. A transmit controller 412 retrieves control words and data frames from transmit buffer 410 and forwards them to encoder 402. If the node is transmitting or receiving data (i.e. participating in an exchange of data), receive controller 406 creates or updates exchange information in exchange tables 416 in response to received control words or data frames, and forwards data from received data frames to the node's i/o bus. Transmit controller 416 creates or updates exchange information in exchange tables 416 in response to commands and data from the node's i/o bus, generates control words and data frames in transmit buffer 410, and forwards them to encoder 402. The exchange tables 416 are used to track non-concurrent sequences of data frames that are related to a specific exchange. A protocol interface manager 414 is provided to manage exchanges in a way suitable to provide operations specified in a higher level protocol used by the i/o bus. One such protocol, SCSI, includes such operations as FORMAT UNIT, INQUIRY, MODE SELECT, MODE SENSE, READ, REPORT, RESERVE, RELEASE, SEND DIAGNOSTIC, START UNIT, STOP UNIT, and WRITE. Each operation corresponds to a single exchange. The execution of each of these operations involves at least the transmission of a command and the reception of a reply, either of which may span non-concurrent data frame sequences.

Also shown in FIG. 4 is a buffer-credit manager 418. As described previously, before an initiating node can transmit a data frame to a responding node, it must first secure a buffer credit from that node. Consequently, when receive controller 406 receives a control word indicating that a remote node wishes to transmit data, the buffer credit manager 418 is enabled, and the transmit controller 412 begins transmitting buffer credit control words in response to a credit signal from buffer credit manager 418. At the beginning of an exchange, the receive buffer 408 is empty of data frames, and the buffer credit manager 418 is provided with the negotiated frame size and the receive buffer capacity, and it is expected to generate and manage a number of buffer credits at least equal to the maximum receive buffer capacity divided by the frame size, with as little delay as possible.

FIG. 5 shows one implementation of a buffer credit manager. It includes a comparator 502 which asserts a credit signal when it determines that the additional committed buffer space (i.e. the buffer space committed but not yet occupied) is less than the available buffer capacity by at least the size of one data frame. The additional committed buffer space is the space for which buffer credits have been transmitted and not yet filled by received data frames. Receive controller 406 includes a counter or register which tracks the amount of available buffer space the receive buffer 408. This value is provided as one input to the comparator 502. The other input to the comparator 502 is the sum of the additional committed buffer space and the maximum frame size. This sum is calculated by adder 510 which adds the maximum frame size to the contents of register 504. Register 504 tracks the amount of buffer space which has been committed for receive data but not yet occupied. This additional-committed-buffer-space value in register 504 is initialized to zero, and then determined incrementally in response to flags from the transmit and receive controllers. An adder 506 adds the size of a data frame to the additional committed buffer space value every time a transmit flag is asserted. The transmit flag is asserted by the transmit controller to indicate that a buffer credit has been sent. A second adder subtracts the size of a data frame from the additional committed buffer space value every time a receive flag is asserted. The receive flag is asserted by the receive controller each time a complete data frame is received by the receive buffer. Since the data storage required for completely received frames is accounted for in the available buffer space, the buffer credit manager doesn't need to continue reserving space for it. Since the actual amount of stored data is being used in this iterative buffer-credit management strategy, more efficient use of the buffer space is possible. When the size of the received data frames is less than the maximum frame size, the extra space can add up to allow additional buffer credits to be sent. Using this strategy, the number of credits made available by the buffer credit manager is at least equal to the maximum buffer capacity divided by the frame size, but it may be greater when received data frames are smaller than the maximum frame size. Importantly, the credits are generated quickly since only additions, subtractions, and comparisons are used. This incremental "one-more-credit?" evaluation is well suited to the serial communication channel since only one credit can be sent at a time anyway. The hardware implementation of this buffer credit manager is advantageously fast, simple and inexpensive.

Numerous variations and modifications will become apparent to those skilled in the art once the above disclosure is fully appreciated. For example, the committed buffer space register may be initialized to the frame size rather than zero, and the comparator would then compare to the buffer capacity rather than the buffer capacity minus the frame size. This results in the same operation while eliminating a subtraction operation. It is intended that the following claims be interpreted to embrace all such variations and modifications.

What is claimed is:

1. A serial communication adapter which comprises:
   a receive buffer for storing received data frames having a maximum frame size, wherein the receive buffer has a predetermined storage capacity;
   a receive controller coupled to the receive buffer, wherein the receive controller is configured to track the amount of available buffer space in the receive buffer by maintaining an available buffer space value, wherein the available buffer space value is increased by an amount corresponding to less than the maximum frame size in response to receiving frames having a size less than the maximum frame size;
   a transmit controller configured to send a buffer credit in response to a credit signal, wherein the buffer credit is indicative of available space for a data frame in the receive buffer;
   a buffer credit manager coupled to the receive controller to receive a receive flag for each received complete data frame and coupled to the transmit controller to receive a transmit flag for each buffer credit sent, wherein the buffer credit manager maintains a committed space value corresponding to additional committed buffer space, wherein the committed space value is incremented by an amount corresponding to the maximum frame size in response to the transmit controller sending a buffer credit and is decremented by the amount corresponding to the maximum frame size in response to the receiver buffer receiving a data frame, wherein the buffer credit manager includes a comparator configured to compare the committed space value to the available buffer space value and is configured to assert the credit signal in response to determining that the available buffer space is greater than the additional committed buffer space by at least the maximum frame size.

2. The serial communication adapter of claim 1, wherein the buffer credit manager further comprises:
   an additional-committed-buffer-space register which is configured to store the committed space value indicative of the additional-committed-buffer-space; and
   an adder coupled to the additional-committed-buffer-space register to add the committed space value to the amount corresponding to the maximum frame size to determine a comparator input,
   wherein the comparator is coupled to the adder to compare the comparator input to the available buffer space value.

3. The serial communication adapter of claim 2, wherein the buffer credit manager further comprises a second adder coupled to the additional-committed-buffer-space register to receive said committed space value and configured to subtract the amount corresponding to the maximum frame size from said committed space value in response to the receive flag being asserted.

4. The serial communications adapter of claim 3, wherein the buffer credit manager further comprises a third adder coupled to the additional-committed-buffer space register to receive said committed space value and configured to add the amount corresponding to the maximum frame size to said committed space value in response to the transmit flag being asserted.

5. The serial communications adapter of claim 4, further comprising a transceiver configured to receive a serial bitstream from a remote node and coupled to the receive controller to responsively provide the received data frames, wherein the transceiver is further coupled to the transmit controller to receive buffer credits and configured to responsively transmit a serial bitstream to the remote node.

6. The serial communications adapter of claim 2, wherein the buffer credit manager further comprises a third adder coupled to the additional-committed-buffer space register to receive said committed space value and configured to add the amount corresponding to the maximum frame size to said committed space value in response to the transmit flag being asserted.

7. The serial communications adapter of claim 1, further comprising a transceiver configured to receive a serial bitstream from a remote node and coupled to the receive controller to responsively provide the received data frames, wherein the transceiver is further coupled to the transmit controller to receive buffer credits and configured to responsively transmit a serial bitstream to the remote node.

8. A system network comprising a remote node and a local node coupled by a serial communications link, wherein the remote node is configured to transmit a data frame having a maximum frame size to the local node only if the remote node receives a buffer credit from the local node indicative of available receive buffer space for a data frame, wherein the local node includes a network interface unit for coupling to the serial communications link, and wherein the network interface unit includes:
   a receive buffer for storing received data frames having a maximum frame size, wherein the receive buffer has a predetermined storage capacity;
   a receive controller coupled to the receive buffer, wherein the receive controller is configured to track available buffer space in the receive buffer by maintaining an available buffer space value, wherein the available buffer space value is increased by an amount corresponding to less than the maximum frame size in response to receiving frames having a size less than the maximum frame size;
   a transmit controller configured to send a buffer credit in response to a credit signal, wherein the buffer credit is indicative of available space for a data frame in the receive buffer;
   a buffer credit manager coupled to the receive controller to receive a receive flag for each received data frame and coupled to the transmit controller to receive a transmit flag for each buffer credit sent, wherein the buffer credit manager maintains a committed space value corresponding to additional committed buffer space, wherein the committed space value is incremented by an amount corresponding to the maximum frame size in response to the transmit controller sending a buffer credit and is decremented by the amount corresponding to the maximum frame size in response to the receiver buffer receiving a data frame, wherein the buffer credit manager includes a comparator configured to compare the committed space value to the available buffer space value and is configured to assert the credit signal in response to determining that the available buffer space is greater than the additional committed buffer space by at least the maximum frame size.

9. The system network of claim 8, wherein the buffer credit manager further comprises:

a register which is configured to store the committed space value;

an adder coupled to the register to add the amount corresponding to the maximum frame size to the committed space value to determine a tentative additional-committed-buffer-space value, wherein the comparator is coupled to the adder to compare the tentative additional-committed-buffer-space value to the available buffer space value.

10. The system network of claim 9, wherein the buffer credit manager further comprises a second adder coupled to the register to receive the committed space value and configured to subtract the amount corresponding to the maximum frame size from said committed space value in response to the receive flag being asserted.

11. The system network of claim 10, wherein the buffer credit manager further comprises a third adder coupled to the register to receive the committed space value and configured to add the amount corresponding to the maximum frame size to said committed space value in response to the transmit flag being asserted.

12. The system network of claim 10, wherein the network interface unit further includes a transceiver coupled to receive a serial bitstream from the remote node via the serial communications link, wherein the transceiver is coupled to the receive controller to responsively provide the received data frames, wherein the transceiver is further coupled to the transmit controller to receive buffer credits and configured to responsively transmit a serial bitstream to the remote node via the serial communications link.

13. The system network of claim 9, wherein the buffer credit manager further comprises a third adder coupled to the register to receive the committed space value and configured to add the amount corresponding to the maximum frame size to said committed space value in response to the transmit flag being asserted.

14. The system network of claim 9, wherein the network interface unit further includes a transceiver coupled to receive a serial bitstream from the remote node via the serial communications link, wherein the transceiver is coupled to the receive controller to responsively provide the received data frames, wherein the transceiver is further coupled to the transmit controller to receive buffer credits and configured to responsively transmit a serial bitstream to the remote node via the serial communications link.

* * * * *